United States Patent
Salter et al.

(10) Patent No.: US 10,300,869 B1
(45) Date of Patent: May 28, 2019

(54) WASHER FLUID TANK WITH MAGNETICALLY RESPONSIVE SENSORS

(71) Applicant: Ford Global Technologies, LLC, Dearborn, MI (US)

(72) Inventors: Stuart C. Salter, White Lake, MI (US); Segundo Baldovino, Novi, MI (US); Paul Kenneth Dellock, Northville, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/827,038

(22) Filed: Nov. 30, 2017

(51) Int. Cl.
*B60R 16/02* (2006.01)
*B60R 16/023* (2006.01)
*G01D 5/14* (2006.01)
*G01F 23/00* (2006.01)
*G01F 23/74* (2006.01)
*B60S 5/00* (2006.01)
*B60S 1/50* (2006.01)

(52) U.S. Cl.
CPC ......... *B60R 16/0232* (2013.01); *G01D 5/145* (2013.01); *G01F 23/0069* (2013.01); *G01F 23/74* (2013.01); *B60S 1/50* (2013.01); *B60S 5/00* (2013.01)

(58) Field of Classification Search
CPC . B60R 16/0232; G01D 5/145; G01F 23/0069; G01F 23/74
See application file for complete search history.

(56) References Cited

U.S. PATENT DOCUMENTS

| 5,686,894 | A | 11/1997 | Vig et al. | |
|---|---|---|---|---|
| 6,028,521 | A * | 2/2000 | Issachar | G01F 23/62 340/618 |
| 6,539,797 | B2 * | 4/2003 | Livingston | G01F 23/266 73/290 R |
| 9,116,030 | B2 | 8/2015 | Farmanyan et al. | |
| 9,297,686 | B1 | 3/2016 | Ross, Jr. | |
| 9,664,553 | B1 * | 5/2017 | Smith | G01F 23/30 |
| 2003/0183002 | A1 * | 10/2003 | Burger | G01F 23/74 73/313 |

(Continued)

FOREIGN PATENT DOCUMENTS

| DE | 102008021382 A1 | 11/2009 |
|---|---|---|
| DE | 102015210312 A1 | 12/2016 |
| JP | 2014-J02496 | * 5/2014 |

OTHER PUBLICATIONS

PEPKA article entitled "Position and Level Sensing Using Hall Effect Sensing Technology," Copyright ©2006-2013, Allegro MicroSystems, LLC, AN295044, Rev. 1.

*Primary Examiner* — Francis C Gray
(74) *Attorney, Agent, or Firm* — Frank A. MacKenzie; Bejin Bieneman PLC (57) ABSTRACT

A washer fluid tank assembly for vehicle mounting includes a tank, a track, a float and two magnetically-responsive sensors. The tank has a fill opening. The track is formed in a first wall of and inside the tank. The float is slidably disposed on the track and has a magnet thereon proximate to a second wall of the tank. The magnetically-responsive sensors are fixed to the second wall of the tank in alignment with the track. The sensors are each associated with a predetermined fluid volume.

20 Claims, 7 Drawing Sheets

(56) References Cited

U.S. PATENT DOCUMENTS

| | | | |
|---|---|---|---|
| 2005/0109105 A1* | 5/2005 | Kowalski | G01F 23/74 73/313 |
| 2011/0079078 A1* | 4/2011 | Ho | G01F 23/268 73/304 C |
| 2013/0000741 A1* | 1/2013 | Crary | G01F 23/0023 137/12 |
| 2014/0157992 A1* | 6/2014 | Farotto | G01N 9/12 99/276 |
| 2017/0102261 A1 | 4/2017 | Payne et al. | |

* cited by examiner

WASHER FLUID TANK WITH
MAGNETICALLY RESPONSIVE SENSORS

BACKGROUND

Autonomous vehicles and vehicles with advanced driver assistance systems ("ADAS") may employ a plurality of visual sensors providing a controller or controllers with situational-awareness data including image data indicative of traffic, proximity to other vehicles, traffic control signals, traffic lane locations, etc. Example visual sensors include cameras and LIDAR sensors. Such visual sensors need to be kept clean to allow the vehicle to continue operating. Fluid washers may be used to clean the sensors. However, such systems are only effective when they have an available supply of washer fluid.

DETAILED DESCRIPTION

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A washer fluid tank assembly for vehicle mounting includes a tank, a track, a float and two magnetically-responsive sensors. The tank has a fill opening. The track is formed in a first wall of and inside the tank. The float is slidably disposed on the track and has a magnet thereon proximate to a second wall of the tank. The magnetically-responsive sensors are fixed to the second wall of the tank in alignment with the track. The sensors are each associated with a predetermined fluid volume.

The track may be defined by a rail on which the float is non-rotatably disposed.

The float may include a track groove that receives the rail.

The track groove may have an open side that snaps over the rail for retention thereon.

The tank may further include a first part and a second part with the track being formed in the first part and the parts being bonded together.

The first part and the second part of the tank may be injection-molded plastic formings.

The float may be installed before the first part and the second part are bonded together.

The sensors may be bonded to an outside of the tank.

A first of the sensors may be associated with a first fluid volume of less than half of a capacity of the tank.

A second of the sensors may be associated with a second fluid volume of less than the first fluid volume.

A vehicle visibility washer system includes a first tank, a first track, a first float, two magnetically responsive sensors, a first pumping unit, a plurality of visual sensor cleaners, a windshield washer nozzle, and a controller. The first tank has a fill opening. The first track is formed in a first wall of and inside the tank. The first float is slidably disposed on the track and has a first magnet thereon proximate to a second wall of the tank. The two magnetically-responsive sensors are fixed to the second wall of the tank in alignment with the track. Each sensor is associated with a predetermined fluid volume. The pumping unit is connected to the tank for fluid communication therefrom. The plurality of visual sensor cleaners is connected to the pumping unit for fluid communication therefrom. The windshield washer nozzle is connected to the pumping unit for fluid communication therefrom. The controller is electronically connected to the magnetically-responsive sensors, the pumping unit, the nozzle and the cleaners.

The pumping unit may include a first pump and a second pump. The first pump may be connected to the windshield washer nozzle for fluid communication thereto. The second pump may be connected to the visual sensor cleaners for fluid communication thereto. Each pump may be connected with the tank for fluid communication therefrom. The controller may be electronically connected to the pumps.

The washer system may further include a second tank, a second track, a second float, a third magnetically-responsive sensor, a third pump and a dual filler neck. The second track may be formed in a first wall of and inside the second tank. The second float may be slidably disposed on the second track and may have a second magnet thereon proximate to a first wall of the second tank. The third magnetically-responsive sensor may be disposed on a second wall of the second tank. The third pump may be connected to the second tank for fluid communication therefrom, and to a second plurality of visual sensor cleaners for fluid communication thereto. The dual filler neck may connect to each of the first tank and the second tank.

The washer system may further include a vent in the second tank.

The washer system may further include a first pipe and a second pipe connecting the dual filler neck to the tanks. The first pipe may be disposed between the dual filler neck and the first tank. The second pipe may be disposed between the dual filler neck and the second tank.

The washer system may further include a check valve disposed between the dual filler neck and the second tank.

The first track may include a first rail on which the first float is slidably disposed. The second track may include a second rail on which the second float is slidably disposed.

The first float may include a first track groove that receives the first rail. The first track groove may have an open side that snaps over the first rail for retention thereon. The second float may include a second track groove that receives the second rail. The second track groove may have an open side that snaps over the second rail for retention thereon.

A method of cleaning visual sensors including the steps of providing a tank, providing a track, providing a float, providing a first magnetically-responsive sensor and a second magnetically-responsive sensor, providing a pumping unit, providing a plurality of visual sensor cleaners, providing a windshield washer nozzle, and providing a controller.

The track may be formed in a first wall of and inside the tank. The float may be slidably disposed on the track, and may have a magnet thereon proximate to a second wall of the tank. The first magnetically-responsive sensor and the second magnetically-responsive sensor may be fixed to the second wall of the tank and may be in alignment with the track. Each of the magnetically-responsive sensors may be associated with a predetermined fluid volume. The pumping unit may be connected to the tank for fluid communication therefrom. The plurality of visual sensor cleaners may be connected to the pumping unit for fluid communication therefrom. The windshield washer nozzle may be connected to the pumping unit for fluid communication therefrom. The controller may be electronically connected to the magnetically-responsive sensors, the pumping unit, the nozzle and the cleaners. It may be determined if the float has moved within a sensing range of the first magnetically-responsive sensor. It may be continued to determine whether the float has moved within the sensing range of the first magnetically-responsive sensor when the float has not moved within the sensing range of the first magnetically-responsive sensor. Fluid to the windshield washer nozzle may be restricted when the float has moved within the sensing range of the first magnetically-responsive sensor.

The method of cleaning visual sensors may further include the following steps. It may be determined if the float has moved within a sensing range of the second magnetically-responsive sensor. When it is determined that the float has not moved within the sensing range of the second magnetically-responsive sensor, determining whether the float has moved within the sensing range of the second magnetically-responsive sensor when the float may be continued. When it is determined that the float has moved within the sensing range of the second magnetically-responsive sensor, a volume of fluid remaining in the tank may be determined, a volume of fluid required to complete a trip may be determined, and the volume of fluid remaining may be compared with the volume of fluid required to determine if there is sufficient fluid to complete the trip.

An example vehicle visibility washer system 10 employing a first tank assembly 12 for washer fluid, i.e., a first washer fluid tank assembly, and a method of using the same are illustrated in FIGS. 1-7. The washer system 10 is well suited for (but not limited to) use in a vehicle 13 that may operate in a semiautonomous mode, i.e., a partly autonomous mode of operation requiring some, i.e., occasional, human driver intervention, or a fully autonomous mode, i.e., a fully autonomous mode requiring no human driver intervention. For purposes of this disclosure, an autonomous mode is defined as one in which each of vehicle propulsion (e.g., via a powertrain including an electric motor and/or an internal combustion engine), braking, and steering are controlled by an autonomous vehicle controller, i.e., a computing device (or devices); in a semi-autonomous mode the controller controls one or two of vehicle propulsion, braking, and steering.

Figure 1:
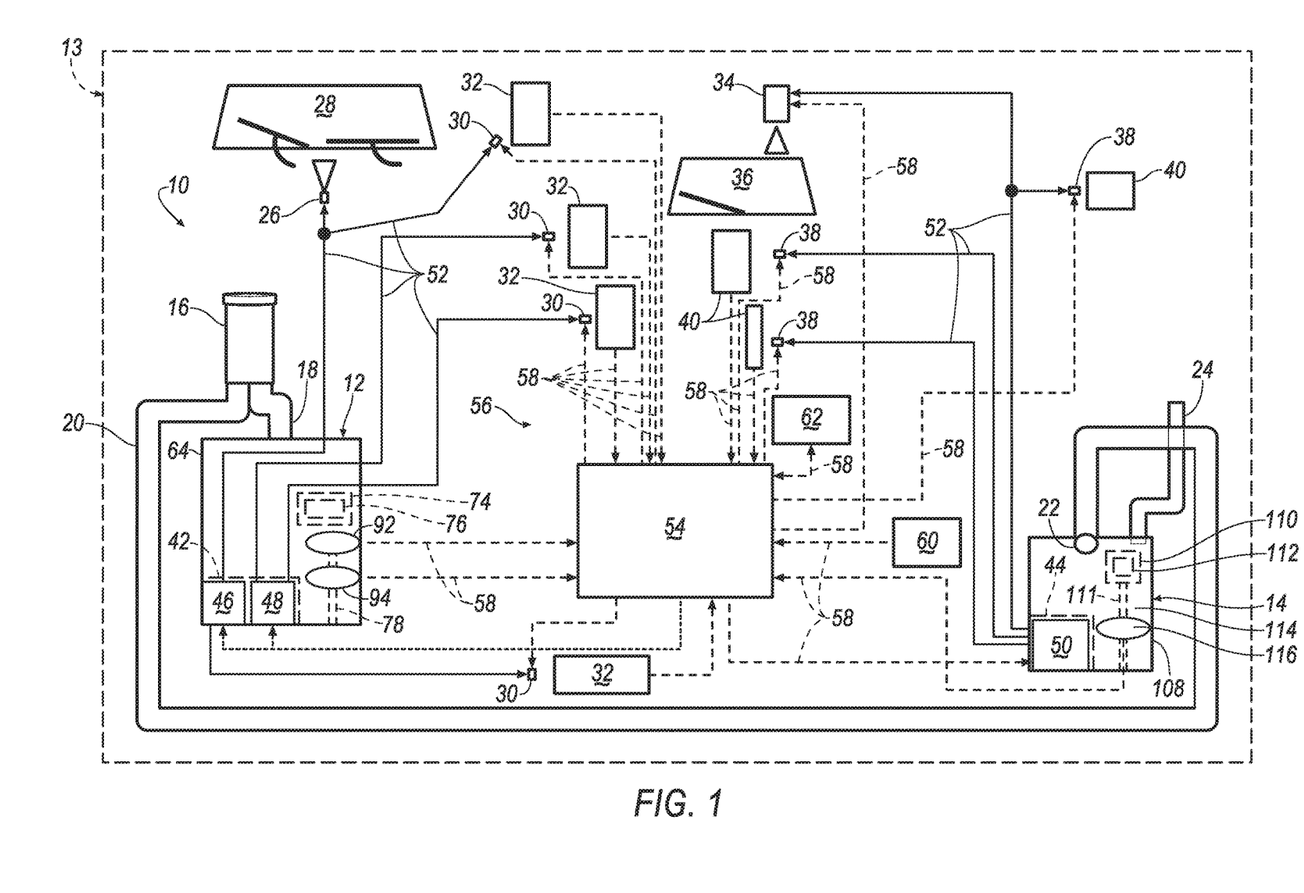
FIG. 1 is a schematic representation of an example washer system.

The system 10, as schematically illustrated in FIG. 1, may include, in addition to the first tank assembly 12, a second tank assembly 14 for washer fluid, i.e., a second washer fluid tank assembly. A dual filler neck 16 may be provided to allow simultaneous filling of the tank assemblies 12 and 14. The dual filler neck 16 may be connected to the first tank assembly 12 by a first supply pipe 18 and to the second tank assembly 14 by a second supply pipe 20. A check valve 22 may be disposed at an end of the second supply pipe 20 to prevent fluid from tank assembly 14 from flowing back toward the dual filler neck 16. The second tank assembly 14 may also include a vent 24 to exhaust air from the tank assembly 14 as it is being filled.

The tank assemblies 12, 14 may be used to provide liquid washer fluid to windows, e.g., a windshield 28 and a backlite 36, and visual sensors 32, 40, e.g., cameras, LIDARs. FIG. 1 illustrates an example arrangement. The first tank assembly 12 may include a first tank 64, a first float 74, a first washer fluid sensor assembly 100 which may be a dual level washer fluid sensor assembly, and a first pumping unit 42. The second tank assembly 14 may include a second tank 108, a second float 110, a second washer fluid sensor assembly, and a second pumping unit 44. The tank assemblies 12, 14 may be used to supply washer fluid to the vehicle's 13 windows and visual sensors. More specifically, a windshield washer nozzle 26, a representation of which in FIG. 1 includes a schematic triangular spray pattern, may be provided to allow washer fluid to be dispensed on the windshield 28. A plurality of first visual sensor cleaners 30 may be used to clean a plurality of first visual sensors 32, e.g., cameras, LIDARs. A rear washer nozzle 34, a representation of which in FIG. 1 includes a schematic triangular spray pattern, may be provided to allow washer fluid to be dispensed on the backlite 36. A plurality of second visual sensor cleaners 38 may be used to clean a plurality of second visual sensors 40, e.g., cameras, LIDARs. The first and second visual sensor cleaners 30, 38 differ primarily in being associated with the first and second tank assemblies 12, 14.

Pressurized liquid washer fluid is supplied to nozzles 26, 34 and cleaners 30, 38 by the first pumping unit 42 of the first tank assembly 12 for fluid communication therefrom and a second pumping unit 44 of the second tank assembly 14 for fluid communication therefrom. The pumping units 42, 44 may each include a plurality of pumps. In the example system 10, the first pumping unit 42 includes two pumps, a first pump 46 and a second pump 48. The example second pumping unit 44 is shown with a third pump 50. Each of the pumps 46, 48, 50, comprising part of their respective pumping units 42, 44, are connected to their respective tanks 64, 108 for fluid communication therefrom, and to their respective sensor cleaners 30, 38 for communication of fluid thereto.

The first pump 46 may supply pressurized washer fluid to the windshield washer nozzle 26, and to a first plurality of first visual sensor cleaners 30 to clean certain of the sensors 32, e.g., a front camera and two front LIDARs. The second pump 48 may supply pressurized washer fluid to a second plurality of first visual sensor cleaners 30 to clean others of the sensors 32, e.g., cameras on the right and left sides of a vehicle roof. The third pump 50, disposed in the second tank assembly 14, may supply pressurized washer fluid to the second visual sensor cleaners 38 and to the rear, i.e., backlite, washer nozzle 34. The washer fluid may be communicated from the pumps 46, 48, 50 to the nozzles 26, 34 and cleaners 30, 38 through a plurality of fluid connecting lines 52, e.g., flexible elastomeric tubes, rigid pipes, etc.

Components, e.g., the nozzles 26, 34, the cleaners 30, 38, the pumps 46, 48, 50, and sensors 32, 40, may be electronically connected to an autonomous vehicle controller 54 by a vehicle network 56. The controller 54 and the network 56 comprise part of the system 10. FIG. 1 shows an example network 56 including a plurality of electronic connectors in the form of electronic connecting lines 58, e.g., wires, disposed between the controller 54 and the nozzles 26, 34, the cleaners 30, 38, the pumps 46, 48, 50 and the sensors 32, 40. The vehicle network 56 may also include an Ethernet network or a controller area network ("CAN") bus or the like that comprise in part the electronic connectors. The network 56 may be configured for using other wired or wireless protocols, e.g., Bluetooth, etc. A wired link from the components directly to the controller 54 is thus not required to provide an electronic connector between the controller 54 and the components 26, 34, 30, 38, 46, 48, 50.

The system 10 may be operated by the autonomous vehicle controller 54. The controller 54, i.e., a computing device (or devices) may be known as an electronic control unit, i.e., an ECU, and may include a virtual driver system ("VDS"). The controller 54 includes at least one electronic processor and an associated memory. The memory includes one or more forms of computer-readable media, and stores instructions executable by the processor for control of the system 10, e.g., performing various system operations, including such operations as disclosed herein.

The memory of the controller 54 further generally stores remote data received via various communications mechanisms. The controller 54 may also have a connection to an onboard diagnostics connector such as an OBD-II connector (not shown). Via the CAN bus, OBD-II, Ethernet, and/or other wired or wireless mechanisms, the controller 54 may transmit messages to various devices in the vehicle 13 and/or receive messages from the various devices, e.g., the pumps 46, 48, the nozzles 26, 34, the sensors 32, 40 as discussed herein. Although the controller 54 is shown as a single controller in FIG. 1 for ease of illustration, it is to be understood that the controller 54 may include and various operations described herein could be carried out by one or more computing devices, e.g., vehicle component controllers such as are known and/or a computing device dedicated to the system 10.

The cleaners 30, 38 and the nozzles 26, 34 may include actuation valves (not shown), either integral or non-integral, allowing the cleaners 30, 38 and nozzles 26, 34 to spray or otherwise distribute fluid in response to electronic signals from the controller 54.

The system 10 may include environmental sensors, e.g., a rain sensor 60 and a temperature sensor (not shown) electronically connected to the controller 54 as discussed above. The system 10 may be in communication with a remote base or office 62. The remote office 62 may provide command and coordination information, e.g., destination information, service depot locations, dispatch instructions, etc. to the vehicle 13 in which the system 10 is mounted.

Figure 2:
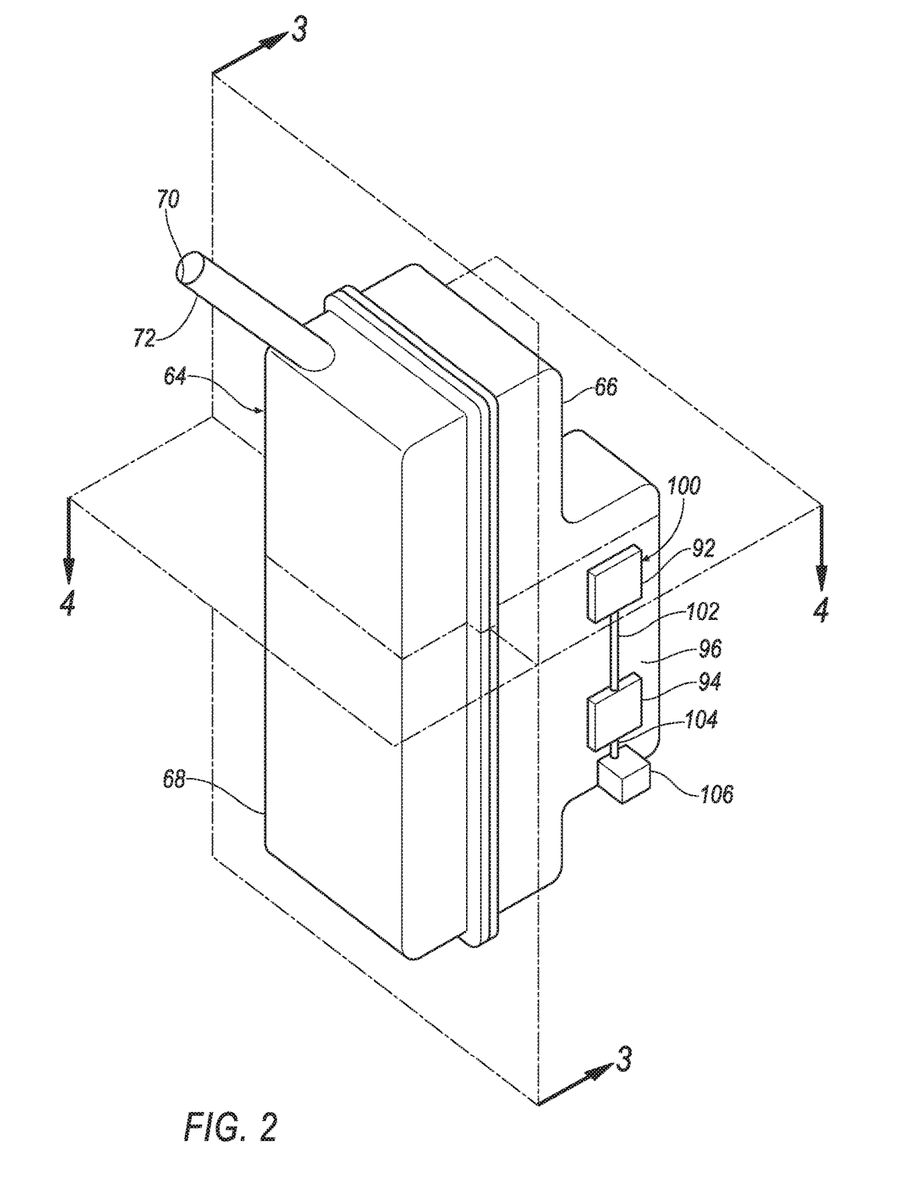
FIG. 2 is a perspective view of an example tank assembly.
Figure 3:
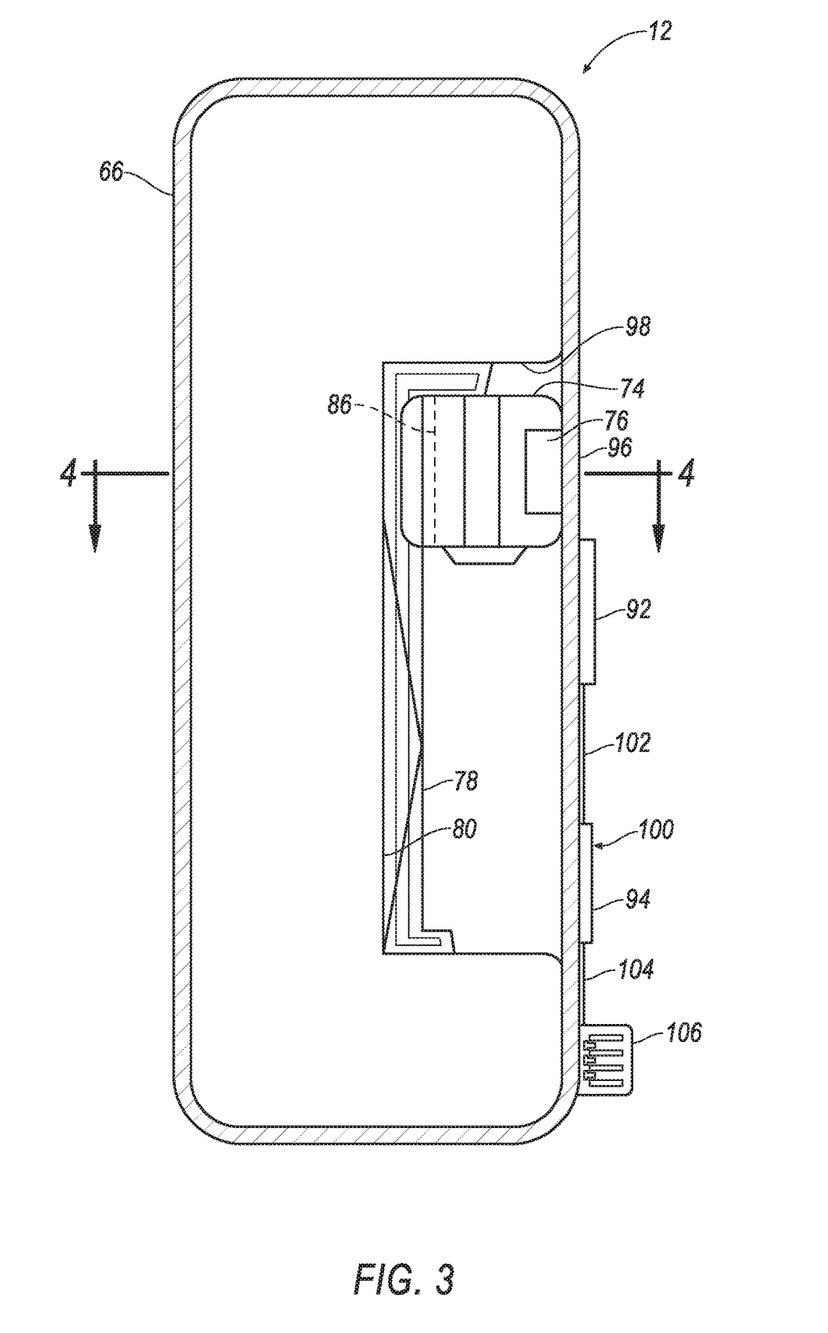
FIG. 3 is a section view of the tank assembly of FIG. 2 taken through plane 3 in the direction of arrows 3.
Figure 4:
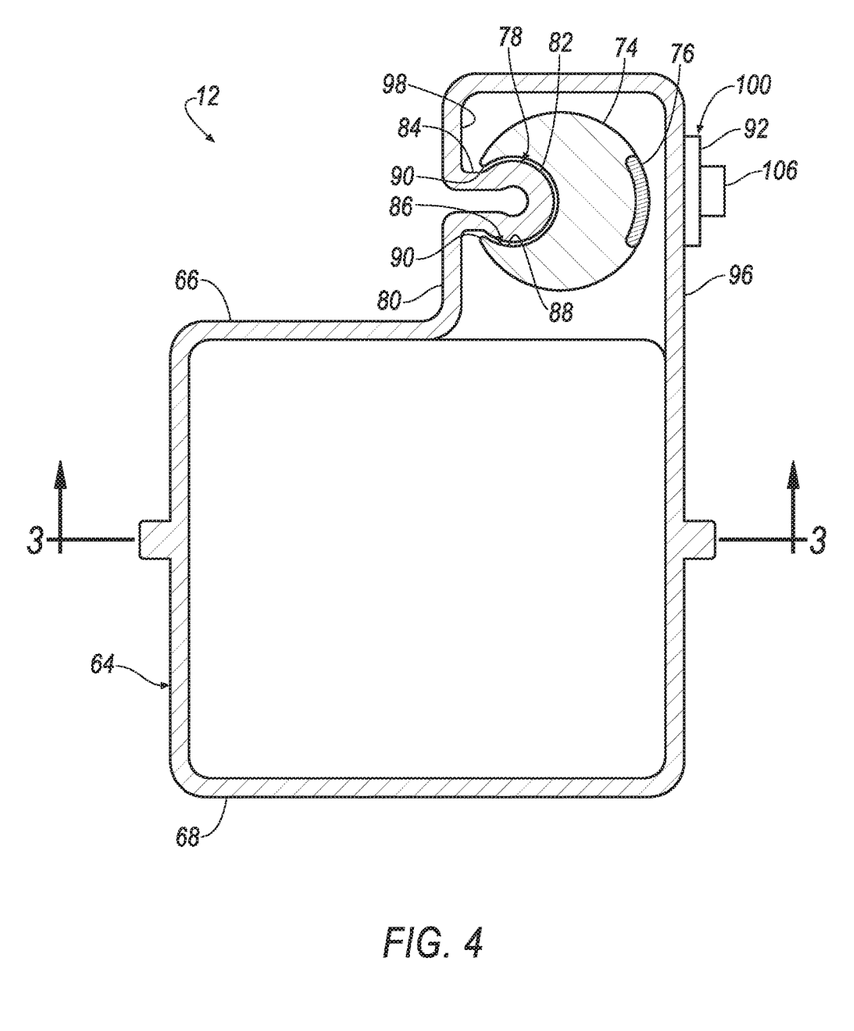
FIG. 4 is a section view of the tank assembly of FIG. 2 taken through plane 4 in the direction of arrows 4.

As illustrated in FIGS. 2-4, the first tank assembly 12 includes the first tank 64 that may include a first tank half shell 66 and a second tank half shell 68. Each of the tank half shells 66, 68 may be an injection-molded plastic forming, with each of the half shells 66, 68 being injection molded of plastic, e.g., thermoplastic polyurethane (i.e., "TPU"). An injection mold may be formed by a pair of facing dies. The mold may receive liquid plastic under pressure. Once formed, the half shells 66, 68 may be bonded together, e.g., heat welded, sonic welded, adhesively bonded, to form the first tank 64. Alternative materials and forming techniques may include vacuum forming and ABS (Acrylonitrile-Butadine-Styrene) plastic sheets. The tank 64 may be formed of more than two parts 66, 68 when, for example, the shape of the tank 64 is too complex to be formed in just two parts.

A fill opening 70 is provided in the tank 64 to allow the washer fluid to enter the tank 64. The fill opening 70 may be formed by a fill tube 72 that may be formed as part of one of the half shells 66, 68. The example fill tube 72 is illustrated as being formed as part of the second tank half shell 68. The tube 72 may be formed integrally with the half shell 68, or may be formed separately and bonded to the half shell 68.

A float 74 is disposed in the tank 64 to allow an indication of fluid level within the tank 64. The float 74 may also be formed of plastic. The float 74 is buoyant in water and water-based mixtures and other liquids used as cleaners. Example float structures that provide such buoyancy include, but are not limited to, forming the float 74 as a hollow, sealed shell, or a shell formed around a core of low-density material, e.g., polystyrene closed cell foam or a shell that is formed and then filled with low density material. The float 74 includes a float magnet 76 fixed thereto. The magnet 76 is disposed proximate to an outer edge of the float.

The tank 64 may include a track 78 formed in a first wall 80 of the tank 64. The track 78 is disposed on an inner surface of the tank 64, i.e., inside of the tank 64. The track 78 may be in the form of a cylindrical rail 82 formed integral with the wall 80 of the shell half 66. The track 78 may include a connecting web 84 connecting the rail 82 to the wall 80. The web 84 has a thickness, i.e., a width, less than a diameter of the rail 82. Each of the rail 82 and the web 84 may be either solid or hollow.

The float 74 may have a track groove 86 that receives the rail 82 for slidable disposition thereon. The float 74 is able to move up and down freely along the track 78 as the fluid level changes. The track groove 86 may be complementary in shape to the track 78, having, for example, an annular portion 88 sized to provide a slip fit with respect to the rail 82, i.e. with the annular portion 88 being slightly larger than the rail 82 to allow the float to freely translate along the rail 82, and an open side with a gap between opposed groove edges 90 spanning the web 84. The gap is sized to provide a slip fit with respect to the web 84, allowing the float 74 to snap onto the track 78 for retention thereon. The annular portion 88 may extend more than 180 degrees around a center of the track groove 86 to the groove edges, allowing retention of the float 74 on the track 78. The float 74 may be slidably disposed on the track 78 by aligning the gap between the edges 90 with the rail 82 and pressing the float 74 against the rail 82 to snap the float 74 onto the track 78. Relative elastic deflection between the rail 82 and the edges 90 allows the edges 90 to move around an outer circumference of rail 82 when float 74 is pushed against the rail 82. After the edges 90 have passed a center of the rail 82, the float 74 is retained by the rail 82.

In the illustrated embodiments of FIGS. 3-6, the track 78 is shown as being straight. However, the float 74 may be configured to accommodate a slight curvature in the track 78 by, for example, forming the track groove 86 as part of two separate parts, e.g., two C-clips (not shown) with a first C-clip proximate to a top of the float 74 and a second C-clip proximate to a bottom of the float 74. Clearance between the float 74 and the first wall 80 may be provided by spacing a side of the float 74 between the two C-clips, i.e., the track groove parts. The space between the C-clips accommodates an arching of the track 78.

The tank assembly 12 includes two level sensors, a first level sensor 92 and a second level sensor 94. Each of the level sensors 92 and 94 may be Hall effect sensors, i.e., magnetically-responsive sensors that generate a signal responsive to the presence of a magnet. The sensors 92, 94 may have power supplied to them at all times to allow their operation. The level sensors 92, 94 are fixed to an outside of a second wall 96 of the tank 64 at a location associated with the track 78. The first level sensor 92 is located at a first location associated with a first level of fluid, i.e., a first fluid volume, e.g., less than half of a capacity of the tank 64, when the tank 64 is in an installed orientation. The second level sensor 94 is located at a second location associated with a second level of fluid, i.e., a second fluid volume. The second fluid volume is less than the first fluid volume. The first fluid volume is indicative of an amount of fluid that may be associated with a first remaining vehicle travel distance, i.e., the distance the vehicle 13 can travel at the current rate of washer fluid consumption before the tank assembly 12 is emptied of washer fluid. The second fluid volume of assembly 12 is indicative of an amount of fluid that may be associated with a second remaining travel distance. The sensors 92, 94 may both be attached to the second wall 96 via heat stake, sonic weld or highly bonding glue.

The float 74 may be disposed in a float chamber 98 of the tank 64 as illustrated in FIGS. 3 and 4. The chamber 98 may have a height less than an overall height of the washer fluid tank 64 in its installed orientation. The first wall 80 and the second wall 96 may form sides of the chamber 98. The chamber 98 must be positioned high enough and be long enough to accommodate placement of the sensors 92, 94 thereon at locations allowing indications of the first and second volumes of the tank assembly 12. The illustrated chamber 98 incorporates the first wall 80 with the track 78 and the second wall 96 with the sensors 92, 94. The float is slidably and non-rotatably disposed on the rail, i.e., the engagement of the float 74 with the track 78 prevents rotation of the float 74 within the chamber, maintaining the magnet 76 in a position facing the second wall 96 as the float translates up and down with the fluid level. With an arrangement as illustrated in FIGS. 3 and 4, the float magnet 76 may be placed opposite the groove 86. Alternatively, the magnet 76 may be placed on a top or a bottom of the float 74, so long as a part of the magnet 76 is proximate to the second wall 96, i.e., within a sensing range of the sensors 92, 94 on the second wall. Yet alternatively, the first and second walls 80, 96 may be at right angles, allowing the magnet 76 to be located at 90 degrees to the groove 86.

The sensors 92, 94 may be integrated into the dual level washer fluid sensor assembly 100. A first connecting strip 102 may be disposed between, and connect, the first level sensor 92 and the second level sensor 94. A second connecting strip 104 may be disposed between, and connect, the second sensor 92 and a sensor connector 106. The connector 106 may be electronically connected to each of the sensor 92, 94 by wires (not shown) that may be incorporated into the strips 102, 104. The connector 106 may receive a plug (not shown) connecting sensors 92, 94 with controller 54 through the network 56. The sensors 92, 94, the connecting strips 102, 104 and the connector 106 may each be bonded to the wall 96 by any appropriate method or mechanism, e.g., heat staking, sonic welding, adhesive bonding, etc.

The dual level washer fluid sensor assembly 100 allows fluid level sensing without any risk of leaking at the sensor assembly 100 as may occur with a float-type level sensor that passes through a side of the tank 64. The level sensor assembly 100 may be adapted to washer fluid tanks of any shape and size.

Each of the sensors 92, 94 produces a signal, e.g., a Hall voltage, indicating the presence of the float magnet 76 when the magnet 76 is in alignment therewith and is within the sensing range of the sensors 92, 94. The sensing range of one of the sensors 92, 94 is a predetermined distance between the magnet 76 and the sensor 92, 94. The range may be determined as a function of several factors that may include an expected temperature range, characteristics of the sensor, and characteristics of the magnet including a shape of the magnet, a size of the magnet, and a field strength of the magnet. The controller 54 is programmed to recognize such signals as indicative of the remaining fluid in the tank 64 being at the first fluid volume when the first level sensor 92 provides a signal indicating magnetic presence, and as indicative of the remaining fluid in the tank 64 being at the second, lower fluid volume when the second level sensor 94 provides a signal indicating magnetic presence.

The second tank assembly 14, except as expressly described herein, has substantially the same structure as the first tank assembly 12, e.g., the second tank assembly 14 may have just the one pump 50 and may include the vent 24. The second tank assembly 14 includes the second tank 108. The tank 108 may be substantially the same as the first tank 64. The second tank 108 may also be injection molded in multiple parts, and assembled by bonding the parts together. A second float 110 may be similarly disposed in the second tank 108. The float 110 may be slidably disposed on a second track 111, with a second track groove (not shown) receiving the second track 111. The second float 110 may include a second float magnet 112. The tank 108 may have its own first wall (not shown) and a second wall 114, with the second track 111 disposed on an inside of the first wall, and a second sensor assembly (not shown) bonded to an outside of the second wall 114. The second sensor assembly may include just one sensor, e.g., a second or lower level sensor 116, and a connector and a connecting strip (not shown) disposed between the connector and the sensor 116. Alternatively, the second sensor assembly may also include a first level sensor above the second level sensor 116.

Figure 5:
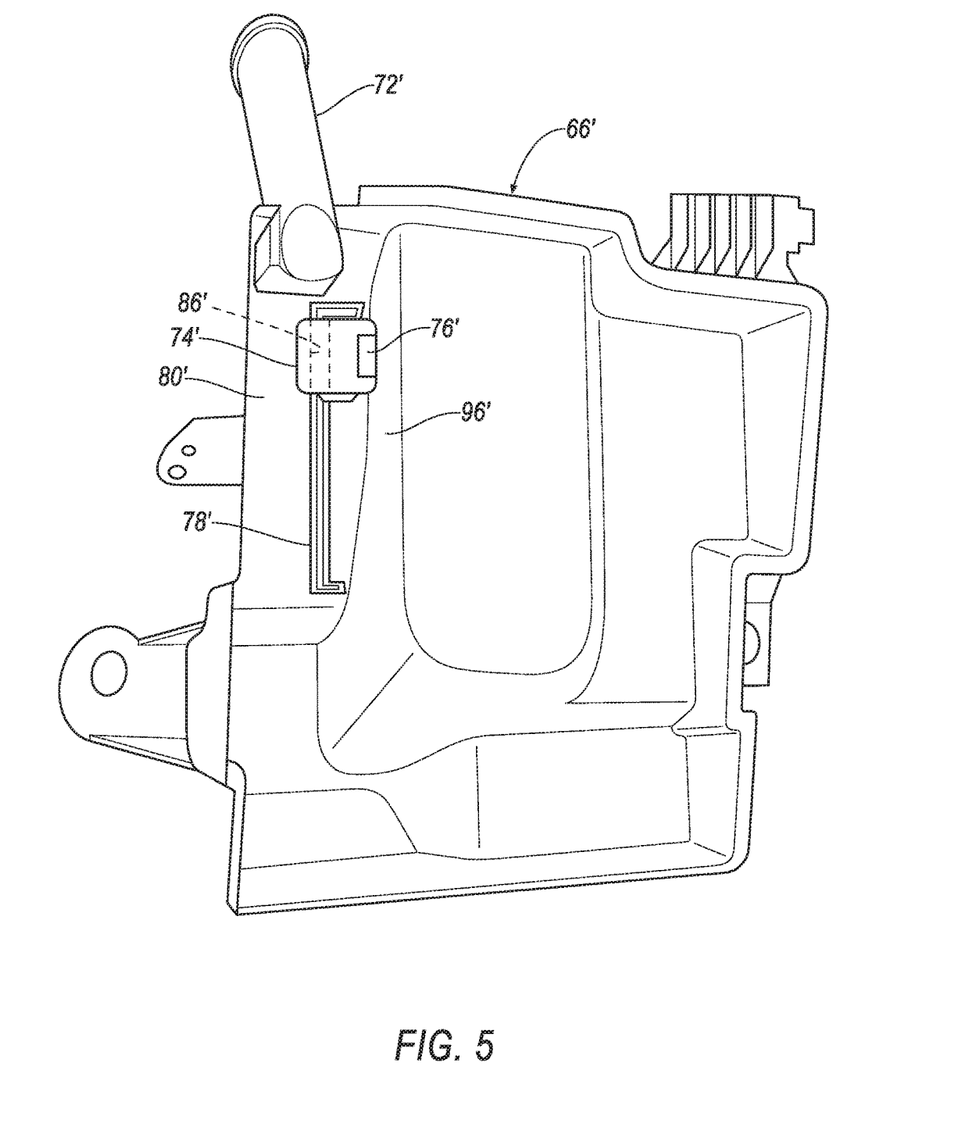
FIG. 5 is a first side view of one side of an alternative embodiment of the tank assembly.
Figure 6:
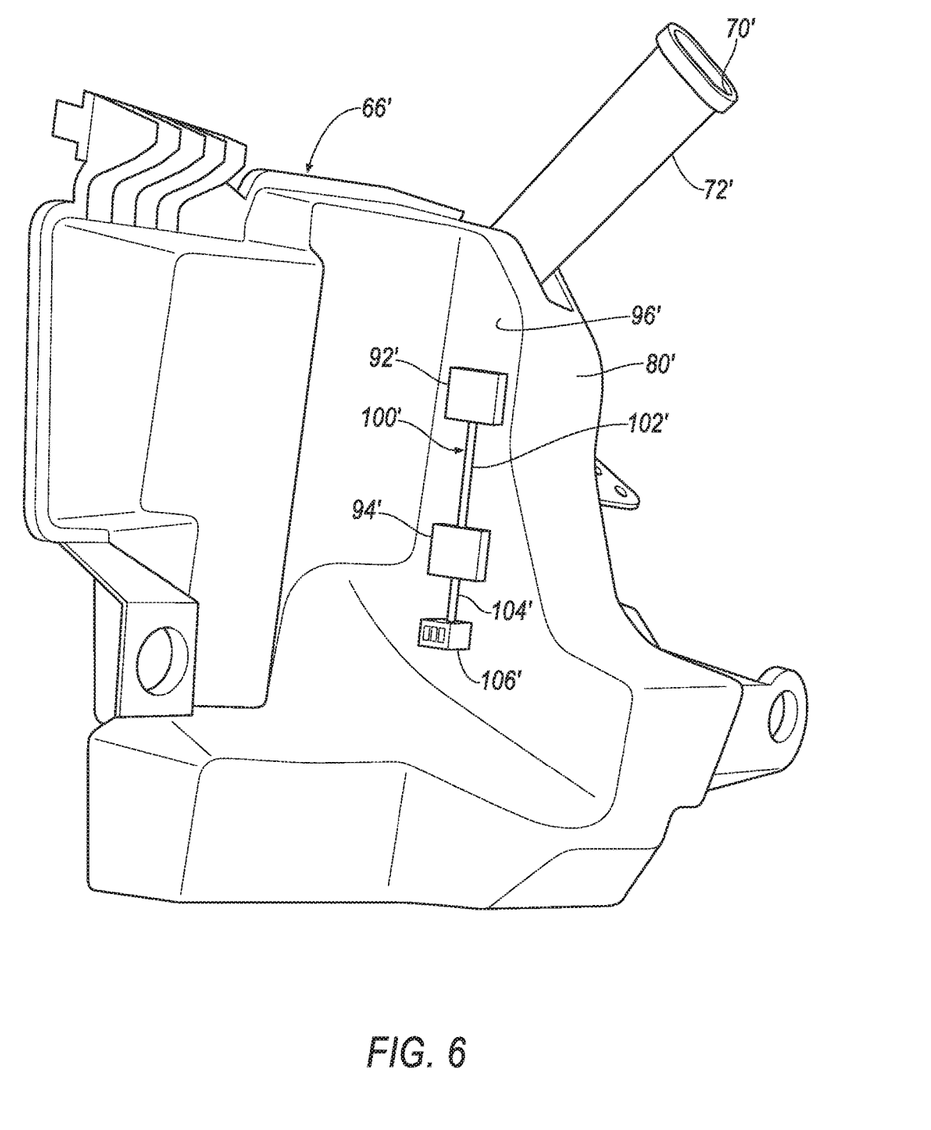
FIG. 6 is a perspective side view of the side of the tank of FIG. 5.

FIGS. 5 and 6 show an alternative example first tank half shell 66' illustrating the flexibility of the system 10 in accommodating a wide variety of tank shapes. Reference numbers used in FIGS. 5 and 6 correspond to reference numbers used in FIGS. 1-4, with the reference numbers used in FIGS. 5 and 6 distinguished from the reference numbers used in FIGS. 1-4 by the use of a prime mark (') to distinguish the elements.

FIG. 5 illustrates an inside of the half shell 66'. A float 74' is slidably disposed on a track 78'. The track 78' is formed on the first wall 80'. The second wall 96' is joined to the first wall 80'. The walls 80' and 96' are substantially perpendicular to each other. Accordingly, a float magnet 76' may be located on the float 74' at a right angle to a track groove 86' in the float 74'. With the magnet 76' and the groove 86' so positioned, the magnet 76' faces the second wall 96'.

FIG. 6 illustrates an outside of the half shell 66'. A dual level washer fluid sensor assembly 100' is disposed on an outside of the second wall 96'. The assembly 100' includes a first level sensor 92' and a second level sensor 94' connected by a first connecting strip 102'. A second connecting strip 104' connects the sensors 92', 94' with a connector 106'. The assembly 100' may vary from the assembly 100 at least in the distance between the sensors 92', 94' of assembly 100' and between the sensors 92, 94 of assembly 100.

Referring to the flow chart of FIG. 7, the system 10 may operate as follows.

Figure 7:
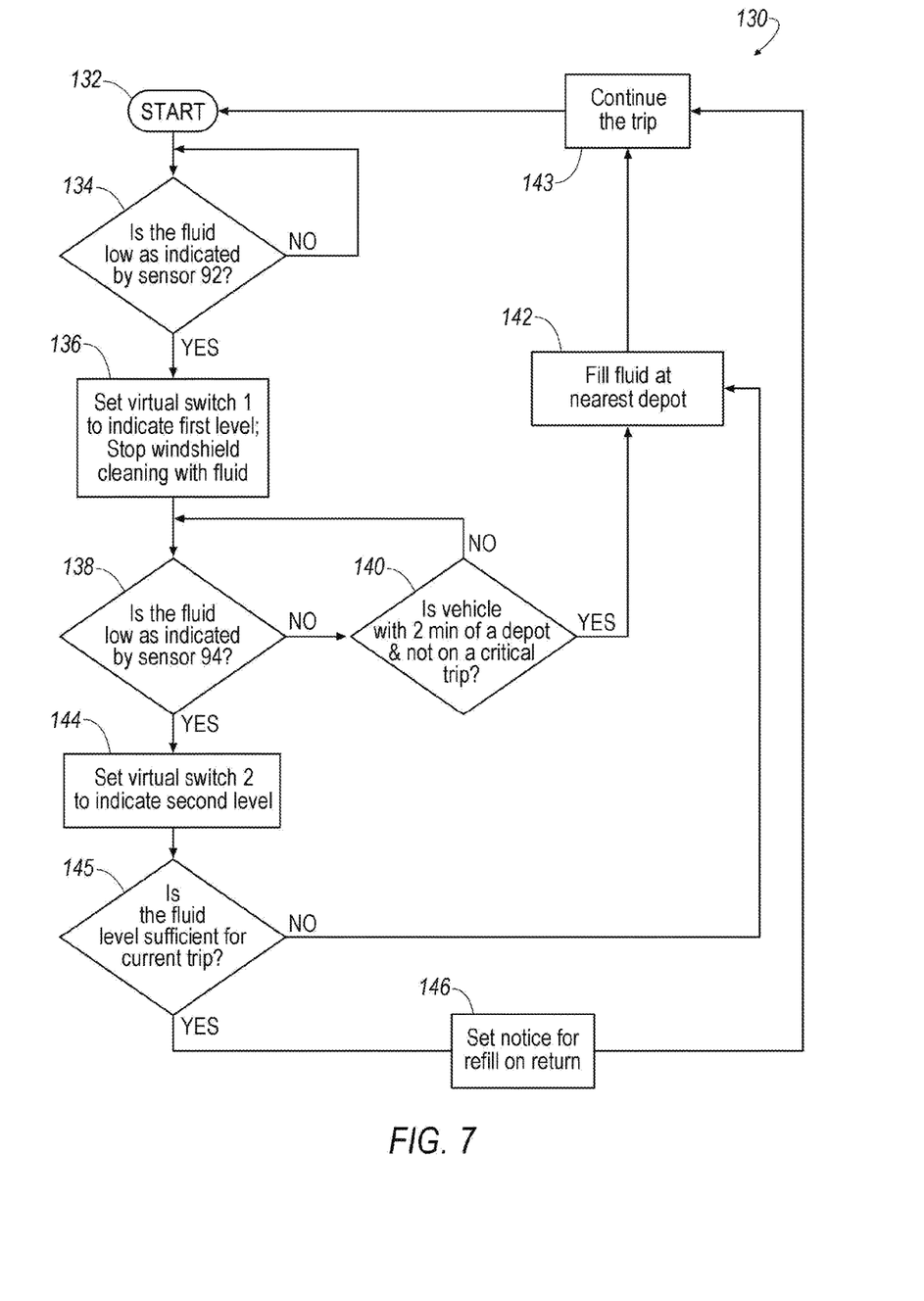
FIG. 7 is an example flowchart of an example process executed by the washer system.

FIG. 7 illustrates a washer fluid level management process 130 for operating the system 10 of FIG. 1, simplified to facilitate understanding of the process 130 by not including operation of the second tank assembly 14. The washer fluid level management process may be stored in the controller 54. The controller 54 executes the example steps illustrated in FIG. 7 as described below. A computer program for executing the process 130 is instantiated in start block 132, e.g., when movement of the vehicle 13 is initiated, or when a power-on command is issued, as may be associated with the vehicle 13 being powered up responsive to an approach or a touch by a vehicle passenger or operator.

Next, decision block 134 checks for a signal from the first level sensor 92, e.g., a Hall voltage, indicating that the float magnet 76 is substantially aligned with the sensor 92 and the fluid level is at the first level, i.e., a first volume of fluid. When the signal from the first level sensor 92 has not been detected, the process 130 returns to the decision block 134 to continue checking for the signal from the sensor 92. When the sensor 92 provides a signal indicating that the fluid level is at the first level, the process 130 moves to process block 136. Process block 136 directs the system 10 to stop the flow of fluid to the windshield washer nozzle 26 to begin conserving fluid. Process block 136 may also set a first virtual switch, virtual switch 1 (not shown) within the controller 54 indicative of a first low level of fluid, i.e., the first fluid volume. The level selected for the first low level of fluid may be one that is low, but not critically low. So long as the sensors 32, 40 on which the vehicle 13 depends for navigation are not behind the windshield 28 or backlite 36, a clean windshield 28 and a clean backlite 36 are not critical to the continued operation of the vehicle 13 when it is operating in the autonomous mode.

The process 130 continues to decision block 138 which checks for a signal from the second level sensor 94, e.g., a Hall voltage, indicating that the float magnet 76 is substantially aligned with the sensor 94 and the fluid level is at the second level, i.e., a second fluid volume. When the signal from the second level sensor 94 has not been detected, the process 130 moves on to decision block 140. Decision block 140 assesses whether the vehicle 13 is within a predetermined time or distance (e.g., two minutes) of a depot that could provide a refill, and whether the trip is a time-critical trip (e.g., emergency transport to a hospital). When the time or distance is greater than the predetermined value, or the trip is timing critical, the trip is continued and the process 130 cycles back to the decision block 138 to continue checking for the signal from the sensor 94. When the anticipated time or distance is less than the predetermined value, and the trip is not time-critical, then the process 130 moves to process block 142.

Process block 142 directs the vehicle 13 to the depot for refilling. Once the tank assembly 12 has been refilled with washer fluid, the process 130 may continue to process block 143 which directs the vehicle 13 to continue the trip. The process 130 then returns to the start block 132 and the condition of sensor 92 stored by the controller 54, i.e., the virtual switch, is reset to an untriggered condition.

When the signal from the second level sensor 94 provides a signal indicating that the fluid level is at the second level, the process 130 moves to process block 144. Process block 144 may set a second virtual switch, virtual switch 2 (not shown) within the controller 54 indicative of a second low level of fluid, i.e., the second level. The level selected for the second low level of fluid may be a critically low level, indicating a significantly limited vehicle operating range. The process 130 moves from process block 144 to decision block 145.

Decision block 145 determines whether there is sufficient washer fluid remaining in the tank assembly 12 to complete the trip by estimating how much fluid will be needed for the rest of the trip, and comparing it with how much fluid is left in the tank assembly 12. When the float 74, as indicated by the effect of the float magnet 76 on the sensor 94, is at the second level, the remaining volume of fluid is known.

With GPS data and route planning functionality, controller 54 may determine a value for the remaining trip distance. The remaining range available with the washer fluid available in the tank assembly 12 may be calculated based on any one of several methods. The washer tank assembly 12 may be equipped with a flow meter (not shown) measuring the quantity of fluid leaving the tank assembly 12. The controller 54 may use the quantity of fluid dispensed over a known travel period (e.g., the last 15 minutes) to calculate a value for the quantity of fluid consumed per unit of time. And so long as the controller has a value for the distance traveled over that same period of time, it may calculate a value for the quantity of fluid consumed per unit of distance. Values for both the quantity of fluid consumed per unit of distance and the quantity of fluid consumed per unit of time may change with road and weather conditions.

An alternative method of calculating rate of fluid usage is to take a known volume difference between level 1 and level 2, and divide it by the number of miles traveled between the first level and the second level. However the value of volume per unit mile is calculated, it is used to determine a remaining travel range before the washer fluid is exhausted. Multiple approaches may be employed with multiple values for the volume per unit mile being calculated, and the highest value for the volume of fluid per mile may be adopted for further calculations. Decision block 145 calculates the volume of fluid required to complete the current trip based on the calculated rate of fluid usage. The decision block 145 then compares the volume in the tank with the volume calculated as needed to complete the trip.

When decision block 145 determines that there is a sufficient volume of fluid remaining to complete the trip, i.e., sufficient fluid, the process 130 may move to process block 146. Process block 146 sets a service notice for the washer fluid to be refilled on the return of the vehicle 13. Process 130 may then continue to process block 143 which directs the vehicle 13 to continue the trip. The process 130 then returns to the start block 132 and the condition of sensors 92, 94 stored by the controller 54, i.e., the virtual switches 1 and 2, may be reset to an untriggered condition.

When decision block 145 determines that there is not enough fluid remaining to complete the trip, the process 130 continues to process block 142. As per, the above, process block 142 directs the vehicle 13 to the depot for refilling. Once the tank assembly 12 has been refilled, the process 130 may move on to process block 143 which directs the vehicle 13 to continue the trip. The process 130 then returns to the start block 132 and the condition of sensors 92, 94 stored by the controller 54, i.e., the virtual switches 1 and 2, are reset to an untriggered condition.

An example tank assembly, a washer system, and method for using the same have been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A washer fluid tank assembly for vehicle mounting comprising:
    a tank having a fill opening;
    a track formed in a first wall of and inside the tank, wherein the track is fixed relative to the tank;
    a float slidably disposed on the track having a magnet thereon proximate to a second wall of the tank; and
    two magnetically-responsive sensors fixed to the second wall of the tank in alignment with the track and each associated with a predetermined fluid volume.

2. The washer fluid tank assembly of claim 1, wherein the track is defined by a rail on which the float is non-rotatably disposed.

3. The washer fluid tank assembly of claim 2, wherein the float includes a track groove that receives the rail.

4. The washer fluid tank assembly of claim 3, wherein the track groove has an open side that snaps over the rail for retention thereon.

5. The washer fluid tank assembly of claim 1, the tank further comprising a first part and a second part with the track being formed in the first part and the parts being bonded together.

6. The washer fluid tank assembly of claim 5, wherein the first part and the second part are injection-molded plastic formings.

7. The washer fluid tank assembly of claim 5, wherein the float is installed before the first part and the second part are bonded together.

8. The washer fluid tank assembly of claim 1, wherein the sensors are bonded to an outside of the tank.

9. The washer fluid tank assembly of claim 1, wherein a first of the sensors is associated with a first fluid volume of less than half of a capacity of the tank.

10. The washer fluid tank assembly of claim 9, wherein a second of the sensors is associated with a second fluid volume of less than the first fluid volume.

11. A vehicle visibility washer system comprising:
a first tank having a fill opening;
a first track formed in a first wall of and inside the tank;
a first float slidably disposed on the track having a first magnet thereon proximate to a second wall of the tank;
two magnetically-responsive sensors fixed to the second wall of the tank in alignment with the track and each associated with a predetermined fluid volume;
a pumping unit connected to the tank for fluid communication therefrom;
a plurality of visual sensor cleaners connected to the pumping unit for fluid communication therefrom;
a windshield washer nozzle connected to the pumping unit for fluid communication therefrom; and
a controller electronically connected to the magnetically-responsive sensors, the pumping unit, the nozzle and the cleaners.

12. The washer system of claim 11, the pumping unit including a first pump and a second pump, the first pump being connected to the windshield washer nozzle for fluid communication thereto and the second pump being connected to the visual sensor cleaners for fluid communication thereto, and each pump being connected with the tank for fluid communication therefrom and the controller being electronically connected to the pumps.

13. The washer system of claim 12, further comprising:
a second tank;
a second track formed in a first wall of and inside the second tank;
a second float slidably disposed on the second track having a second magnet thereon proximate to a second wall of the second tank;
a third magnetically-responsive sensor disposed on a second wall of the second tank; and
a third pump connected to the second tank for fluid communication therefrom and to a second plurality of visual sensor cleaners for fluid communication thereto;
a dual filler neck connected to each of the first tank and the second tank.

14. The washer system of claim 13, further comprising a vent in the second tank.

15. The washer system of claim 13, further comprising a first pipe and a second pipe connecting the dual filler neck to the tanks with the first pipe disposed between the dual filler neck and the first tank and the second pipe disposed between the dual filler neck and the second tank.

16. The washer system of claim 15, further comprising a check valve disposed between the dual filler neck and the second tank.

17. The washer system of claim 13, wherein the first track includes a first rail on which the first float is slidably disposed, and the second track includes a second rail on which the second float is slidably disposed.

18. The washer system of claim 17, wherein:
the first float includes a first track groove that receives the first rail, and the first track groove has an open side that snaps over the first rail for retention thereon; and
the second float includes a second track groove that receives the second rail, and the second track groove has an open side that snaps over the second rail for retention thereon.

19. A method of cleaning visual sensors, the method comprising the steps of:
providing a tank;
providing a track formed in a first wall of and inside the tank;
providing a float slidably disposed on the track having a magnet thereon proximate to a second wall of the tank;
providing a first magnetically-responsive sensor and a second magnetically-responsive sensor with each fixed to the second wall of the tank and in alignment with the track and each of the magnetically-responsive sensors being associated with a predetermined fluid volume;
providing a pumping unit connected to the tank for fluid communication therefrom;
providing a plurality of visual sensor cleaners connected to the pumping unit for fluid communication therefrom;
providing a windshield washer nozzle connected to the pumping unit for fluid communication therefrom; and
providing a controller electronically connected to the magnetically-responsive sensors, the pumping unit, the nozzle and the cleaners;
determining if the float has moved within a sensing range of the first magnetically-responsive sensor;
continuing to determine whether the float has moved within the sensing range of the first magnetically-responsive sensor when the float has not moved within the sensing range of the first magnetically-responsive sensor; and
restricting fluid to the windshield washer nozzle when the float has moved within the sensing range of the first magnetically-responsive sensor.

20. The method of claim 19, further comprising the steps of:
determining if the float has moved within a sensing range of the second magnetically-responsive sensor;
continuing to determine whether the float has moved within the sensing range of the second magnetically-responsive sensor when the float has not moved within the sensing range of the second magnetically-responsive sensor; and
when the float has moved within the sensing range of the second magnetically-responsive sensor, determining a volume of fluid remaining in the tank, determining a volume of fluid required to complete a trip, and comparing the volume of fluid remaining with the volume of fluid required to determine if there is sufficient fluid to complete the trip.

* * * * *